United States Patent [19]

Hickson

[11] Patent Number: 5,228,606

[45] Date of Patent: Jul. 20, 1993

[54] BICYCLE CARRIER FOR ATTACHMENT TO VEHICLE

[76] Inventor: Timothy G. Hickson, 14761 Oxenham Avenue, White Rock, British Columbia, Canada, V4B 2H8

[21] Appl. No.: 738,357

[22] Filed: Jul. 31, 1991

[51] Int. Cl.$^5$ .............................................. B42D 43/02
[52] U.S. Cl. .............................. 224/42.13; 224/42.24; 224/42.46 R
[58] Field of Search ........... 224/32 R, 42.06, 42.03 B, 224/42.13, 42.24, 42.26, 42.43

[56] References Cited

U.S. PATENT DOCUMENTS

| | | | |
|---|---|---|---|
| 2,117,049 | 5/1938 | Widman et al. | 224/42.13 X |
| 4,277,008 | 7/1981 | McCleary | 224/32 R X |
| 4,392,597 | 7/1983 | Traugh | 224/42.13 |
| 4,676,414 | 6/1987 | Deguevara | 224/42.03 B X |
| 4,884,728 | 12/1989 | Temple | 224/42.13 |
| 4,911,343 | 3/1990 | Lords et al. | 224/42.13 X |
| 4,948,021 | 8/1990 | Murphy et al. | 224/42.13 |
| 5,085,360 | 2/1992 | Fortune et al. | 224/42.13 |
| 5,108,020 | 4/1992 | Patrick et al. | 224/42.13 X |
| 5,121,862 | 6/1992 | Schmidt | 224/42.03 B |

Primary Examiner—Allan N. Shoap
Assistant Examiner—Christopher McDonald
Attorney, Agent, or Firm—Bull, Housser & Tupper

[57] ABSTRACT

A bicycle carrier is for attachment to a spare wheel mount extending from a generally vertical panel of a vehicle. The carrier has generally similar first and second bodies wherein each body comprises an inner portion, an outer portion and an intermediate portion. The inner portion is securable to the spare wheel mount within a mounting plane disposed between the spare wheel mount and a spare wheel carried on the mount. The outer portion has a holder for holding at least one bicycle on a first side of the mounting plane. The intermediate portion interconnects the inner and outer portions and has clearance for the spare wheel on the mount, so that the intermediate portion extends from the inner portion to the outer portion radially across the wheel hub and a peripheral portion of the wheel and sidewall of the spare tire on a second side of the mounting plane remote from the first side.

24 Claims, 3 Drawing Sheets

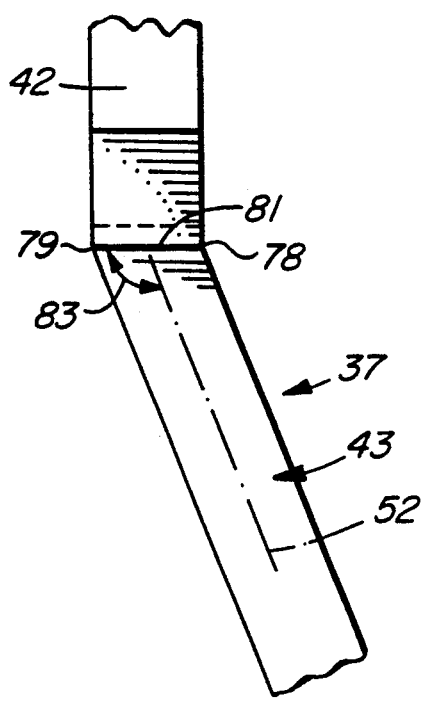
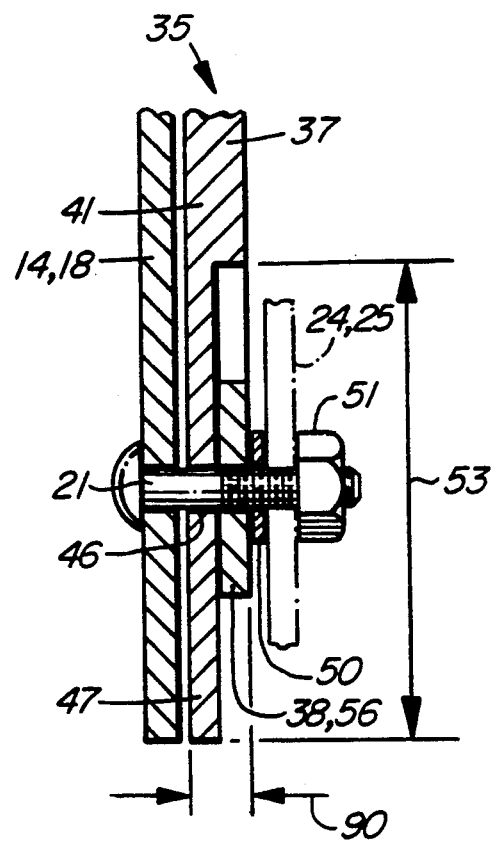
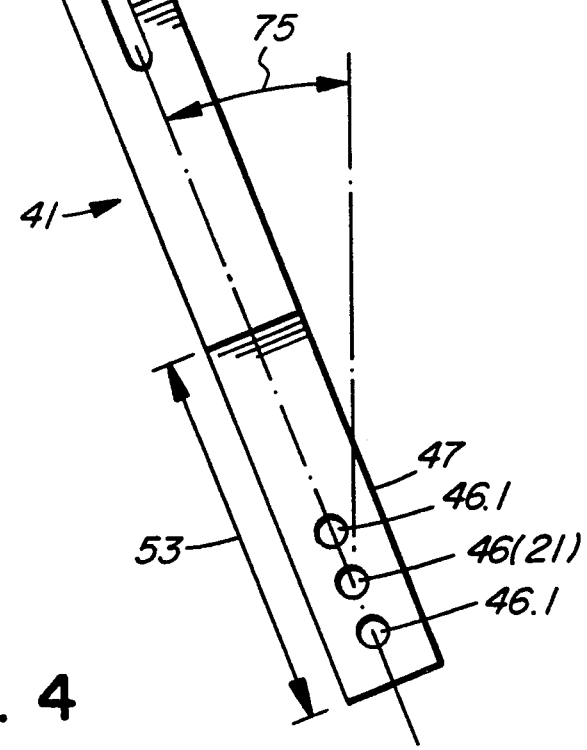
FIG. 4
FIG. 5

BICYCLE CARRIER FOR ATTACHMENT TO VEHICLE

BACKGROUND OF THE INVENTION

The invention relates to a bicycle carrier, particularly a carrier for attachment to a spare wheel mount secured to a generally vertical panel of a vehicle, typically at the rear of the vehicle.

There are many types of bicycle carriers for attachment to vehicles to enable one or more bicycles to be easily carried on the vehicle. Some bicycle carriers are secured to the roof of the vehicle but these can be difficult to load with the bicycle, and also considerably increase height of the vehicle, thus limiting parking options etc. of the vehicle when carrying bicycles. Other types of carriers are secured to the rear bumper of the vehicle, but securing this type can present difficulties with modern vehicles with "faired-in" bumpers, in which commonly there is no simple way of connecting the carrier.

With many prior art bicycle carriers, the carrier can be easily removed from the vehicle using common tools. Consequently, locking the bicycle to the carrier in an attempt to secure the bicycle against theft can be easily overcome by removing the carrier as well as the bicycle.

Many rough road or back country vehicles carry a spare wheel on a vertical rear panel of the vehicle. Typically, a spare wheel mount extends rearwardly from the rear panel and is provided with studs which register with stud openings in the hub of the spare wheel. Because the spare wheel often projects rearwardly of the bumper, mounting of the spare wheel in this manner restricts use of some types of bumper-mounted rear wheel carriers. Even if a bumper-mounted carrier can be fitted to the rear bumper of the vehicle, difficulty can be experienced when removing the spare wheel from the vehicle, especially if the bicycle carrier must first be removed to permit the spare wheel to be removed. This can be difficult if the securing nuts and bolts of the carrier have rusted or become damaged from accidental impact.

SUMMARY OF THE INVENTION

The present invention reduces the difficulties and disadvantages of the prior art by providing a bicycle carrier which is simple to manufacture, and thus of relatively low cost, is quick and simple to install on a spare wheel mount, and is easily adjustable to accommodate spare wheel mounts which carry wheels of different diameters. The carrier can be easily fitted to a vehicle using existing wheel mounting studs that are normally used to secure a spare wheel to the spare wheel mount, and thus additional work on the vehicle is not required.

Furthermore, when the carrier is secured to the vehicle, locking devices on the studs that normally prevent unauthorized removal or theft of the spare wheel also prevent unauthorized removal of the carrier. The bicycle can be locked to the carrier, and thus unauthorized removal of both the bicycle and carrier is prevented. Also, when the carrier is secured to the vehicle, the spare wheel can be removed without requiring removal of the carrier.

A bicycle carrier according to the invention is for attachment to a spare wheel mount of a vehicle and comprises generally similar first and second bodies. Each body comprises an inner portion, an outer portion and an intermediate portion. The inner portion is securable to the spare wheel mount within a mounting plane disposed between the spare wheel mount and a spare wheel carried on the mount, the spare wheel having a tire. The outer portion has holding means for holding at least one bicycle on a first side of the mounting plane. The intermediate portion interconnects the inner and outer portions and has clearance means for providing clearance for the spare wheel on the mount so that the intermediate portion extends from the inner portion to the outer portion across a peripheral portion of the wheel on a second side of the mounting plane remote from the first side of the mounting plane. Preferably, the inner portion of each body has a main opening adjacent an end portion of the inner portion, and an intermediate opening spaced from the end portion towards the intermediate portion. To enable the carrier to accommodate spare wheel mounts having different wheel stud circle diameters, at least one of the openings of each body is elongated.

Preferably, each body is formed from a length of strip material, and the outer portion of the each body extends from the intermediate portion from a fold axis. The fold axis is inclined at a first angle to a longitudinal axis of the intermediate portion, so that an upper surface of the holding means is obliquely inclined to the intermediate portion to provide a relatively broad seat to receive the bicycle when installed. The clearance means of the intermediate portion can comprise a proximal portion and a distal portion. The proximal portion is connected to the inner portion and is inclined at an angle of between 90 degrees and 160 degrees to the inner portion towards the second side of the mounting plane. Also the distal portion is connected to the proximal portion and disposed generally parallel to the inner portion and is also connected to the outer portion.

A detailed disclosure following, related to drawings, describes a preferred embodiment of the invention which is capable of expression in structure other than that particularly described and illustrated.

DESCRIPTION OF THE DRAWINGS

FIG. 4 is a simplified, fragmented rear elevation of one body or portion of the carrier, FIG. 5 is a simplified, fragmented section generally on line 5—5 of FIG. 1.

DETAILED DISCLOSURE

Figure 1:
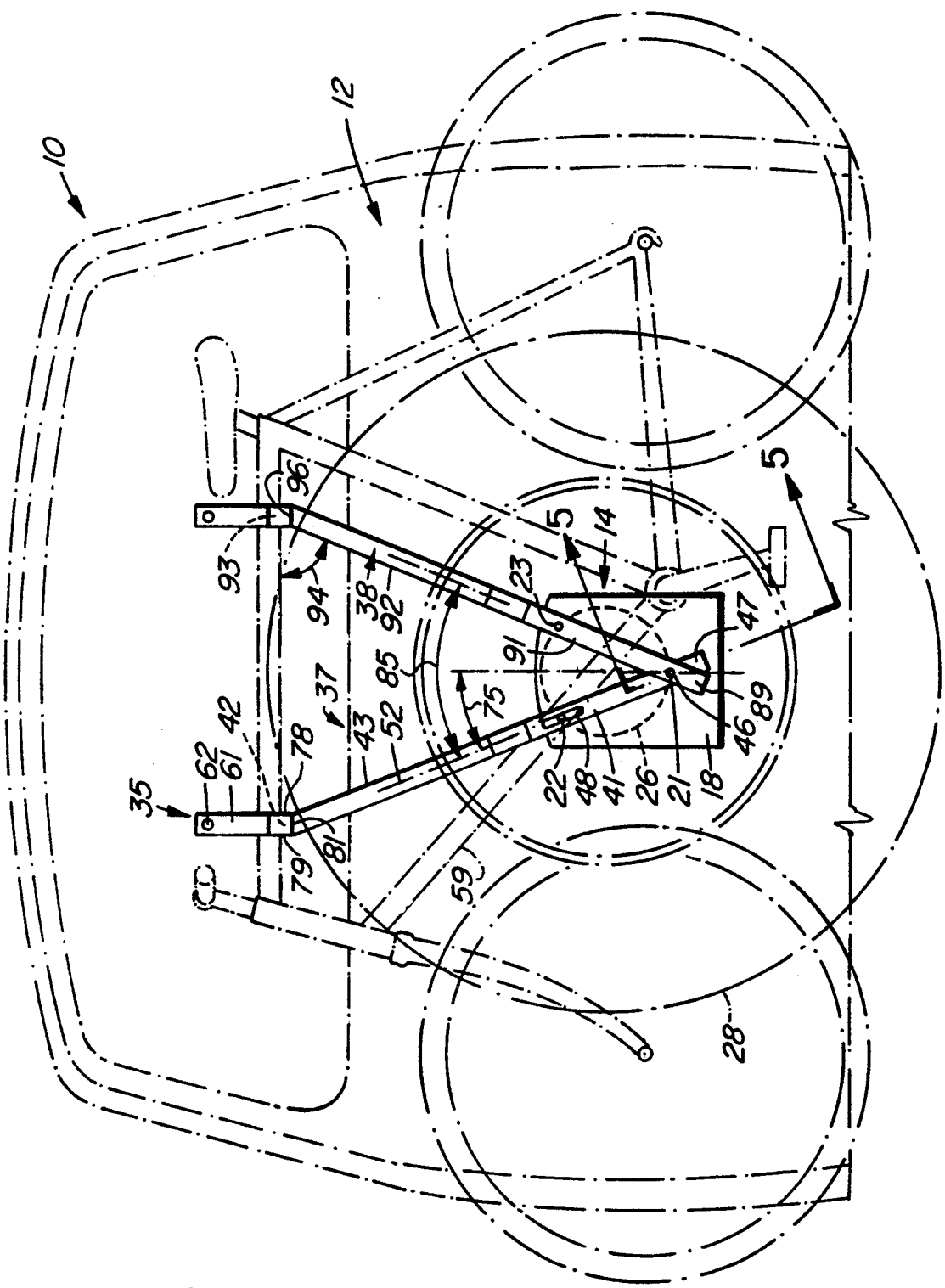
FIG. 1 is a simplified, fragmented, diagrammatic rear elevation of a vehicle fitted with a bicycle carrier according to the invention; portions of a spare wheel attached to the vehicle and portions of a bicycle carried on the carrier being shown in broken outline.
Figure 3:
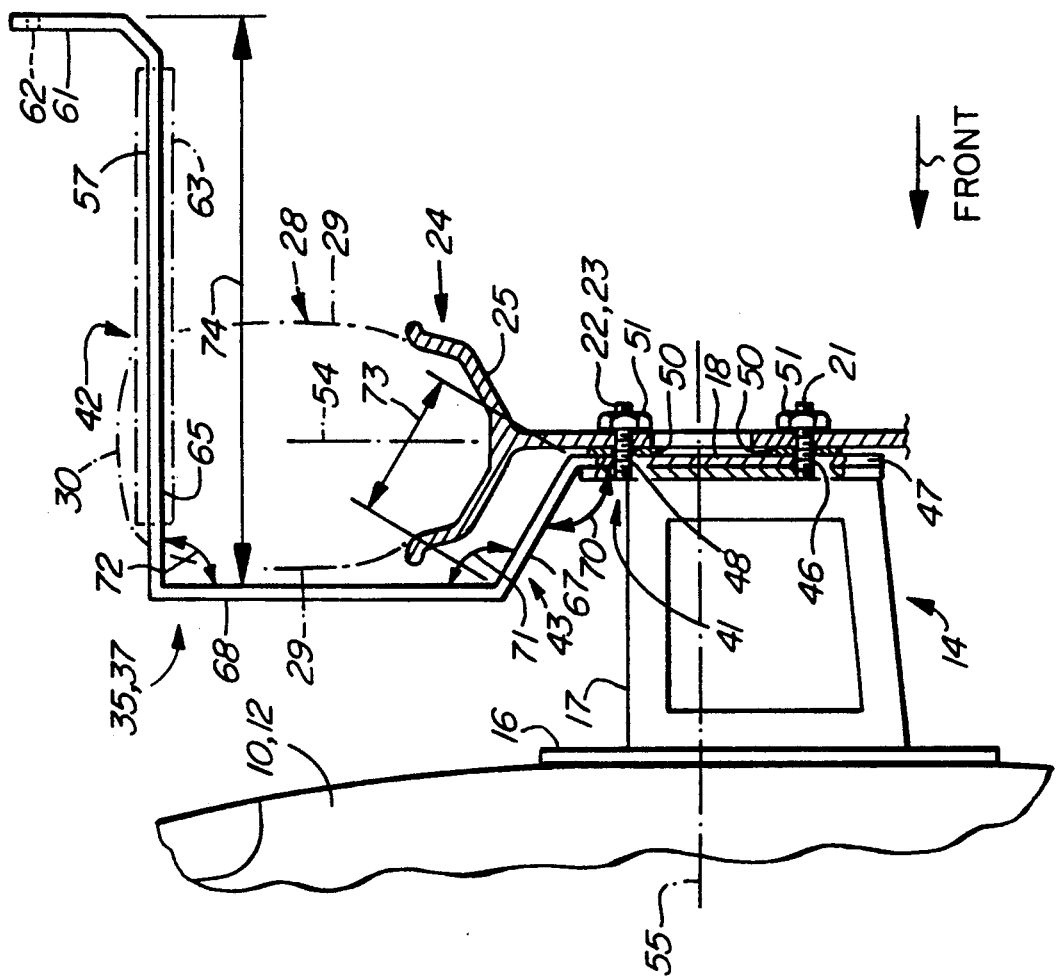
FIG. 3 is a simplified fragmented side elevation of one portion of a mount, which is generally similar to the view in FIG. 2, and shows in broken outline approximate location of a tire and hub of the spare wheel.

Referring mainly to FIGS. 1 and 3, a vehicle 10 has a rear panel 12 fitted with a conventional spare wheel mount 14. The spare wheel mount 14 is a typical prior art mount for use with off-road vehicles, such as jeeps and similar vehicles having a generally vertical rear panel which can be fixed, or it can be a rear door hinged for opening. The spare wheel mount 14 has a front or inner portion 16 secured to the vehicle rear panel, an upper portion 17 and a rear or outer portion 18 generally parallel to the inner portion 16 and disposed generally vertical. The outer portion is has three wheel mounting studs 21, 22 and 23, the studs being disposed in an inverted triangular shape as seen in FIG. 1. The wheel mounting studs mount a spare wheel 24 having a rim 25 provided with a plurality of stud openings on a wheel stud opening pitch circle 26. Clearly the studs 21, 22 and 23 are positioned to register with the stud openings on the rim 25, and thus are disposed on the appropriate pitch circle 26 corresponding to the wheel size and make of the vehicle. Thus the studs are on the spare wheel mount and serve as securing means for securing the spare wheel thereto. The rim carries a tire 28 having sidewalls 29 and a tread portion 30.

Referring also to FIG. 1, a bicycle carrier 35 according to the invention comprises generally similar first and second bodies 37 and 38 respectively, each body being formed from a similar length of flat strip material and bent to a particular shape as will be described. As the body portions are essentially similar, the first body 37 only will be described in detail.

Referring also to FIGS. 4 and 5, the first body comprises an inner portion 41, an outer portion 42 and an intermediate portion 43 interconnecting the inner and outer portions. The inner portion 41 has a main opening 46 adjacent an end portion 47 of the inner portion, and an intermediate opening 48 spaced from the end portion towards the intermediate portion. The openings 46 and 48 receive the studs 21 and 22 respectively which extend rearwardly from the spare wheel mount 14 and pass through the respective openings. The body 37 is lightly secured on the studs with push-nuts 50, which are relatively thin compared with regular hexagonal nuts and thus do not occupy much length of the studs. As seen in FIG. 4, the main opening 46 is preferably circular to receive the stud 21, whereas the intermediate opening 48 is elongated for receiving the spare wheel mounting stud 22 therethrough in one of many positions. The elongation of the opening is along a longitudinal axis 52 of the inner portion and the intermediate portion to increase manufacturing tolerances for fitting, and to permit the body to be mounted to spare wheel mounts having different stud pitch circle diameters. This increases versatility of the bicycle mount and permits easier accommodation of different stud circle diameters. In some instances, the main opening 46 could also be oval, or several openings 46.1 as shown in FIG. 4 could be provided, so as to accommodate wheels of widely different diameters, so that close cooperation between the outer portion 42 of the body and the tread portion 30 of the spare tire can be attained as will be described.

Also, as seen in FIG. 5, the end portion 47 of the inner portion 41 adjacent the main opening 46 is thinner than remaining portions of the body, preferably approximately one half the thickness of remaining portions of the body, for a short distance 53 from the end (e.g. a few inches). This is to permit cooperation with the second body 38 which has an end portion 56 which is similarly thinner. Two thin end portions 47 and 56 occupy less length of the stud 21 than two normal thickness end portions, and usually sufficient length of the stud 21 remains to retain a regular hexagonal nut 51 as shown. Also use of two stacked together relatively thin end portions presents a relatively uniform thickness adjacent the opening 46 equal to the thickness of the body elsewhere, so that the attitude of the spare wheel is generally vertical.

As seen in FIGS. 3 and 5, the push-nut 50 lightly attach the body in place to the spare wheel mount when the spare wheel 24 has been removed and usually remain in place when the spare wheel is refitted. Because the push-nuts are thin, and the end portions of the bodies are reduced in thickness, there is usually sufficient length of stud to receive the hexagonal nut 51 for positively securing the spare wheel onto the studs. Usually, the nuts 51 are required so that the bodies are safely secured in place to carry the bicycle, even when the spare wheel is not fitted. Thus, it can be seen that the inner portion 41 is secured to the spare wheel mount 14 within a mounting plane 54 disposed between the spare wheel mount 14 and the spare wheel 24 carried on the mount. It is noted that the mounting plane 54 is normal to a rotational axis 55 of the spare wheel 24. Because only one portion of each body 37 and 38 is secured on each stud 22 and 23 respectively, each body occupies the same length of the respective stud as the two stacked together thinner end portions 47 and 56.

Figure 2:
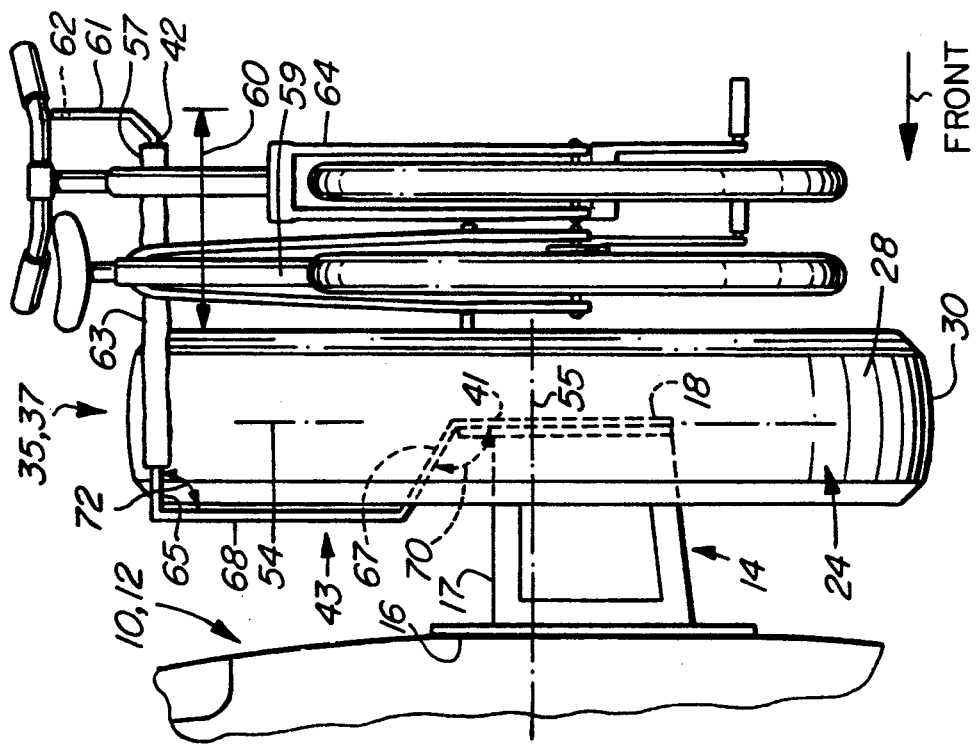
FIG. 2 is a simplified, fragmented, diagrammatic side elevation of a rear portion of the vehicle, the spare wheel mount and carrier according to the invention being shown carrying a pair of bicycles.

As seen in FIGS. 2 and 3, the outer portion 42 of the body 37 has a generally horizontal holding means 57 for holding at least one bicycle 59 on a first side of the mounting plane 54. For a rear-mounted wheel, the first side of the mounting plane 54 is disposed rearwardly of the plane 54. The holding means has an upturned end portion 61 which is spaced rearwardly from a rear sidewall of the tire. This space provides a length of the outer portion which overhangs the sidewall of the tire to provide an overhung portion 60 with sufficient space to receive at least the bicycle 59, and for preventing the bicycle from falling off the holding means. In FIG. 2, two bicycles 59 and 64 are shown, but with a sufficiently large overhung portion 60 additional bicycles could be carried. The upturned end portion 61 extends normally to the portion 42 through a short oblique portion. The end portion 61 also has an opening 62 to receive a bicycle lock, not shown, to secure the bicycle to the carrier. When the bicycle is locked to the carrier through the opening 62, and at least one of nuts 51 holding the spare wheel is a conventional securable lockable nut, it can be seen that both the bicycle and carrier are also securely locked to the vehicle to resist theft or unauthorized removal. Resilient padding 63, such as an expanded or foamed elastomeric sleeve, provides padding on an upper surface of the holding means to protect the bicycle from scratching from the holding means.

The holding means 57 extends generally parallel to the rotational axis 55 and axially across the tread portion 30 of the spare wheel. Preferably, to provide additional support for the holding means against weight of the bicycles, a lower surface 65 of the holding means 57 is in contact with the tread portion 30, and, thus the tread portion provides additional support for the holding means against bending due to weight of the bicycle.

The intermediate portion 43 of the body 37 has a straight proximal portion 67 and a straight distal portion 68. The proximal portion is connected to the inner portion and is inclined at an angle 70 to the inner portion towards a second side of the mounting plane which is remote from the first side of the plane. For a rear-mounted wheel, the second side of the mounting plane is disposed oppositely to the first side, i.e. forwardly of the plane 54. The angle 70 is approximately 120 degrees as shown, but can be between approximately 90 degrees and 160 degrees. The distal portion 68 is connected to the proximal portion 67 and disposed generally parallel to the inner portion 41, and is inclined at an angle 71 to the proximal portion. By geometry, the angle 71 equals the angle 70. Preferably, the outer portion extends rearwardly and outwardly from the distal portion and is inclined at an angle 72 thereto, the angle 72 being approximately 90 degrees. In the example shown, the tire has an approximately "square profile", that is the tread width is approximately equal to depth of the sidewall of the tire. For this tire profile, the distal portion and the proximal portions have approximately equal lengths. Clearly, for a different shape of tire, this could vary somewhat. Also, so that the outer portion 42 provides sufficient overhang length 60 or space to carry at least two bicycles, the outer portion extends on the first side of the mounting plane some considerable distance beyond a rearward sidewall of the tire so as to provide clearance for bicycles to hang therefrom. For a normal tire width, the proximal portion 67 has a length 73 of between one quarter (¼) and one half (½) of length 74 of the outer portion 42.

It can be seen that the intermediate portion interconnects the inner and outer portions and has clearance means, ie the proximal and distal portions 67 and 68, for providing clearance for the spare wheel on the mount. The portions 67 and 68 are shaped so that the intermediate portion extends from the inner portion 41 to the outer portion 42 and passes generally radially across a peripheral portion of the wheel (i.e. the sidewall 29 and adjacent rim portion) on a second side of the mounting plane remote from the first side of the mounting plane. This shape results in the advantageous support of the carrier by the tire to resist weight of the bicycle which also provides security against theft for the carrier and bicycle.

As seen in FIGS. 1 and 4, the body 37 is inclined at a body angle 75 (between 10 degrees and 30 degrees) to the vertical passing through the stud 21. If the outer portion 42 were bent from the intermediate portion 43 in a normal manner so that a fold axis between the portions was at right angles to the longitudinal axis 52 of the intermediate portion, an inside edge portion 78 of the holding means would be higher than an outside edge portion 79. The edge portion 78 would present a relatively sharp edge of the holding means for supporting the bicycle, which would be prone to damage the crossbar of the bicycle. In order to avoid this potential problem, the outer portion 42 extends from the intermediate portion 43 from a first fold axis 81 which is inclined at a first fold angle 83 to the longitudinal axis 52 of the intermediate portion. The fold angle 83 is dependent on the body angle 75, and by geometry it can be seen that the angle 83 is 90 degrees less the angle 75.

As previously stated, and referring to FIGS. 1 and 5, the second body 38 is generally similar to the first body 37, but differs in two respects. The first difference relates to the end portion 56 of an inner portion 91 of the body 38 which corresponds to the end portion 47 of the inner portion 41. As previously stated, the end portion 56 of the inner portion 91 also has a thickness of approximately one half of the remaining portions of the body, but the thin end portion 89 is disposed oppositely to the end portion 47. Thus, when the end portions 47 and 56 are stacked on the stud 21 (see FIG. 5), overall thickness of the two thinner end portions is approximately equal to thickness of one end portion, and the remaining inner portions 41 and 91 of the two bodies are co-planar. This provides a more uniform thickness for the studs and usually adequate length of stud remains to receive the hexagonal nut 51, and also provides symmetry for the carrier when installed on the spare wheel mount.

The second difference relates to a fold between intermediate and outer portions 92 and 93 of the body 38. As seen in FIG. 1, the bodies are inclined at opposite but equal angles to the vehicle, and the second body resembles in part a mirror image of the first body, particularly with respect to angular disposition between the corresponding portions 92 and 93. The outer portion 93 extends from a second fold axis 96 adjacent the intermediate portion 92 which is inclined at a second fold angle 94 to a longitudinal axis (not shown) of the intermediate portion 92. In this way, the fold axes 81 and 96 of each body 37 and 38 are disposed at complementary angles to each other, so that the respective holding means of each outer portion 42 and 93 are generally aligned with each other so as to provide generally aligned, co-planar relatively broad seats to receive the bicycle and to prevent edges of the holding means from damaging the bicycle.

OPERATION

To install the bicycle carrier 35 on the vehicle 10, the spare wheel 24 is first removed from the spare wheel mount 14 by unscrewing the three retaining nuts 51 on the mounting studs 21, 22 and 23. The first main openings adjacent the end portions 47 and 56 of the first and second bodies are then registered with each other and passed over the lower mounting stud 21, while the corresponding intermediate openings of the bodies receive the remaining studs 22 and 23. The bodies 37 and 38 are inclined to each other at a second body angle 85 which is twice the body angle 75, as seen in FIG. 1. The pushnuts 50 are fitted to the studs at this time to lightly retain the carrier in place until the spare wheel is re-installed and secured using the nuts 51. Alternatively, the pushnuts can be omitted and the spare wheel can be passed over the studs and held against the carrier until the wheel is secured in place in a normal manner using only the nuts 51. With correctly sized bodies and spare wheel, the outer portions 42 and 93 of the carrier are within a common plane and should rest lightly against the tread portion of 30 of the tire 28 so as to assist in carrying weight of bicycles on the carrier.

I claim:

1. An equipment carrier for attachment to a spare wheel mount of a vehicle, the carrier comprising:
   generally similar first and second essentially rigid bodies, each body comprising:
   (a) an inner portion having at least one opening to receive a stud or bolt of the spare wheel mount for securing the inner portion to the spare wheel mount within a mounting plane disposed between the spare wheel mount and a spare wheel carried on the mount, the spare wheel having a tire,
   (b) an outer portion having a holding means for cooperating with equipment on a first side of the mounting plane,
   (c) an intermediate portion interconnecting the inner and outer portions, the intermediate portion having a clearance means for providing clearance for the spare wheel on the mount, the intermediate portion extending from the inner portion to the outer portion across a sidewall of the tire located on a second side of the mounting plane remote from and opposite to the first side of the mounting plane.

2. A carrier as claimed in claim 1, in which:
(a) the inner portion of each body has a main opening adjacent an end portion of the inner portion, and an intermediate opening spaced from the end portion towards the intermediate portion.

3. A carrier as claimed in claim 2 wherein:
(a) at least one of the openings of each body is elongated for receiving a spare wheel mounting stud therethrough, elongation of the opening permitting the body to be mounted to spare wheel mounts having different wheel stud pitch circle diameters,
(b) an end portion of the inner portion has a thickness of approximately one half of the remaining portion of the body.

4. A carrier as claimed in claim 1, wherein:
(a) the mounting plane is normal to a rotational axis of the spare wheel,
(b) the holding means extends parallel to said rotational axis and axially across the tread portion of the spare wheel.

5. An apparatus as claimed in claim 4, wherein said holding means comprises:
(a) an upturned end portion for preventing the equipment from falling off said holding means, the upturned end portion having an opening therein,
(b) a resilient padding on an upper surface of the holding means to protect the equipment.

6. A carrier as claimed in claim 1, in which:
(a) each body is formed from a length of strip material,
(b) the outer portion of each body extends from the intermediate portion from a fold axis, the fold axis being inclined at a first angle to a longitudinal axis of the intermediate portion so that an upper surface of the holding means is obliquely inclined to the intermediate portion to provide a relatively broad seat to receive the equipment when installed.

7. A carrier as claimed in claim 6 in which:
(a) the inner portion of each body has a main opening adjacent an end portion of the inner portion, and an intermediate opening spaced from the end portion towards the intermediate portion,
(b) the intermediate portions of the bodies are inclined to each other at a body second angle when the main openings of the inner portion are in register with each other and are installed on a mounting stud of the spare wheel mount,
(c) the fold axes of each body are disposed at complementary angles to each other so that the holding means are generally aligned with each other so as to provide two generally aligned, co-planar, relatively broad seats to receive the equipment.

8. A carrier as claimed in claim 1, in which:
(a) the clearance means of the intermediate portion comprises a proximal portion and a distal portion, the proximal portion being connected to the inner portion and inclined at an angle of between 90 degrees and 160 degrees to the inner portion towards the second side of the mounting plane, and the distal portion is connected to the proximal portion and the outer portion, the distal portion being disposed generally parallel to the inner portion.

9. A carrier as claimed in claim 8, in which:
(a) the proximal portion has a length of between approximately one quarter and one half of the length of the outer portion.

10. A carrier as claimed in claim 9, in which:
(a) the distal portion and the proximal portion have approximately equal lengths.

11. A combination of a vehicle, a spare wheel and an equipment carrier, the vehicle having a spare wheel mount having an outer portion with spare wheel securing means for securing the spare wheel thereto, the equipment carrier comprising:
(a) generally similar first and second essentially rigid bodies, each body comprising:
  (i) an inner portion having at least one opening to receive a stud or bolt of the spare wheel mount for securing the inner portion to the spare wheel mount within a mounting plane disposed between the spare wheel mount and the spare wheel carried on the mount, the spare wheel having a tire with a tread portion and sidewalls,
  (ii) an outer portion having a holding means for cooperating with equipment on a first side of the mounting plane,
  (iii) an intermediate portion interconnecting with the inner and outer portions, the intermediate portion having clearance means for providing clearance for the spare wheel on the mount, the intermediate portion extending from the inner portion to the outer portion across a sidewall of the tire located on a second side of the mounting plane remote from and opposite to the first side of the mounting plane.

12. A combination as claimed in claim 11, in which:
(a) the outer portions of each body has a lower surface generally in contact with the tread portion of the tire, so that the spare tire provides additional support for the equipment carrier.

13. A combination as claimed in claim 11, in which:
(a) the inner portion of each body has a main opening adjacent an end portion of the inner portion, and an intermediate opening spaced from the end portion towards the intermediate portion, the main openings being in registration with each other and the bodies being inclined at an angle relative to each other,
(b) the spare wheel securing means of the spare wheel mount comprises three wheel mounting studs extending therefrom, of which a lower mounting stud passes through the aligned main openings of the first and second bodies, and remaining two studs pass through the intermediate openings so as to hold the two bodies at an angle relative to each other.

14. A combination as claimed in claim 11, wherein:
(a) the mounting plane is normal to a rotational axis of the spare wheel,
(b) the holding means extends parallel to said rotational axis and axially across a tread portion of the spare wheel.

15. A combination as claimed in claim 11, wherein:
(a) the holding means comprises a upturned end portion spaced rearwardly from a rear sidewall of the tire so as to overhang the sidewall of the tire to provide sufficient space to receive the equipment, and to prevent the equipment from falling off the holding means, the upturned end portion having an opening therein, (b) a resilient padding is provided on an upper surface of the holding to protect the equipment.

16. A combination as claimed in claim 11 in which:
(a) each body is formed from a length of strip material,
(b) the outer portion of each body extends from the intermediate portion from a fold axis, the fold axis being inclined at a first angle to a longitudinal axis of the intermediate portion so that an upper surface of the holding means is obliquely inclined to the intermediate portion to provide a relatively broad seat to receive the equipment when installed.

17. A combination as claimed in claim 16 in which:
(a) the inner portion of each body has a main opening adjacent an end portion of the inner portion, and an intermediate opening spaced from the end portion towards the intermediate portion, each inner portion also having an end portion having a thickness of approximately one half of the remaining portion of the body,
(b) the intermediate portions of the bodies are inclined to each other at a second body angle when the main openings of the inner portion are in register with each other and are installed on a mounting stud of the spare wheel mount,
(c) the fold axes of each body are disposed at complementary angles to each other so that the holding means are generally aligned with each other so as to provide two generally aligned, co-planar, relatively broad seats to receive the equipment.

18. A combination as claimed in claim 11, in which:
(a) the clearance means of the intermediate portion comprises a proximal portion and a distal portion, the proximal being connected to the inner portion and inclined at an angle of between 90 degrees and 160 degrees to the inner portion towards the second side of the mounting plane, and the distal portion is connected to the proximal portion and the outer portion, the distal portion being disposed generally parallel to the inner portion and passing adjacent an inner sidewall of the spare tire.

19. A combination as claimed in claim 18 in which:
(a) the proximal portion has a length of between approximately one quarter and one half of the length of the outer portion.

20. A combination as claimed in claim 19 in which:
(a) the distal portion and the proximal portion have approximately equal lengths.

21. A bicycle carrier for attachment to a spare wheel mount of a vehicle, the carrier comprising generally similar first and second bodies, each body comprising:
(a) an inner portion securable to the spare wheel mount within a mounting plane disposed between the spare wheel mount and a spare wheel carried on the mount, the spare wheel having a tire, the inner portion having a main opening adjacent an end portion of the inner portion, and an intermediate opening spaced from the end portion, at least one of the openings being elongated for receiving a spare wheel mounting stud therethrough, elongation of the opening permitting the body to be mounted to spare wheel mounts having different wheel stud pitch circle diameters, and the end portion of the inner portion having a thickness of approximately one half of the remaining portion of the body;
(b) an outer portion having a holding means for holding at least one bicycle on a first side of the mounting plane,
(c) an intermediate portion interconnecting the inner and outer portions, the intermediate portion having a clearance means for providing clearance for the spare wheel on the mount, so that the intermediate portion extends from the inner portion to the outer portion across a peripheral portion of the wheel on a second side of the mounting plane remote from the first side of the mounting plane.

22. A bicycle carrier for attachment to a spare wheel mount of a vehicle, the carrier comprising generally similar first and second bodies, each body comprising:
(a) an inner portion securable to the spare wheel mount within a mounting plane disposed between the spare wheel mount and a spare wheel carried on the mount, the spare wheel having a tire,
(b) an outer portion having a holding means for holding at least one bicycle on a first side of the mounting plane,
(c) an intermediate portion interconnecting the inner and outer portions, the intermediate portion having a clearance means for providing clearance for the spare wheel on the mount, the clearance means of the intermediate portion comprising a proximal portion and a distal portion, the proximal portion being connected to the inner portion and inclined at an angle of between 90 degrees and 160 degrees to the inner portion towards the second side of the mounting plane, and the distal portion being connected to the proximal portion and the outer portion, the distal portion being disposed generally parallel to the inner portion, so that the proximal and distal portions of the intermediate portion extend from the inner portion to the outer portion across a peripheral portion of the wheel on a second side of the mounting plane remote from the first side of the mounting plane.

23. A combination of a vehicle, a spare wheel and a bicycle carrier, the vehicle having a spare wheel mount having an outer portion with spare wheel securing means for securing the spare wheel thereto, the bicycle carrier comprising:
(a) generally similar first and second bodies, each body comprising:
(i) an inner portion secured to the spare wheel mount within a mounting plane disposed between the spare wheel mount and the spare wheel carried on the mount, the spare wheel having a tire with a tread portion and sidewalls,
(ii) an outer portion having a holding means for holding at least one bicycle on a first side of the mounting means,
(iii) an intermediate portion interconnecting the inner and outer portions, the intermediate portion having clearance means for providing clearance for the spare wheel on the mount, so that the intermediate portions extend from the inner portion to the outer portion across a peripheral portion of the wheel on a second side of the mounting plane remote from the first side of the mounting plane,
the combination being further characterized by:
(b) the inner portion of each body having a main opening adjacent an end portion of the inner portion, and an intermediate opening spaced from the end portion towards the intermediate portion, the main openings being in registration with each other and the bodies being inclined at an angle relative to each other, (c) the spare wheel securing means of the spare wheel mount comprising three wheel mounting studs extending therefrom, of which a lower mounting stud passes through the aligned main openings of the first and second bodies, and remaining two studs pass through the intermediate openings so as to hold the two bodies at an angle relative to each other.

24. A combination of a vehicle, a spare wheel and a bicycle carrier, the vehicle having a spare wheel mount having an outer portion with spare wheel securing means for securing the spare wheel thereto, the bicycle carrier comprising:

(a) generally similar first and second bodies, each body being formed from a length of strip material and comprising an inner portion, an intermediate portion and an outer portion; the combination being further characterized by:

(i) each inner portion being secured to the spare wheel mount within a mounting plane disposed between the spare wheel mount and the spare wheel carried on the mount, the spare wheel having a tire with a tread portion and sidewalls, each inner portion also having a main opening adjacent an end portion of the inner portion, and an intermediate opening spaced from the end portion towards the intermediate portion, and each inner portion also having an end portion having a thickness of approximately one half of the remaining portion of the body, (ii) each outer portion having a holding means for holding at least one bicycle on a first side of the mounting means, each outer portion extending from the respective intermediate portion from a fold axis, the fold axis being inclined at a first angle to a longitudinal axis of the said intermediate portion so that an upper surface of the holding means is obliquely inclined to the said intermediate portion to provide a relatively broad seat to receive the bicycle when installed, (iii) each intermediate portion interconnecting the respective inner and outer portions, each intermediate portion having clearance means for providing clearance for the spare wheel on the mount, so that each intermediate portion extends from the inner portion to the outer portion across a peripheral portion of the wheel on a second side of the mounting plane remote from the first side of the mounting plane, the combination being further characterized by:

(b) the intermediate portions of the two bodies being inclined to each other at a second body angle when the main openings of the two inner portions are in register with each other and are installed on a mounting stud of the spare wheel mount, (c) the fold axes of each body are disposed at complementary angles to each other so that the holding means are generally aligned to each other so as to provide two generally aligned, coplanar, relatively broad seats to receive the bicycle.

* * * * *